June 5, 1923.  1,457,328
C. F. M. VAN BERKEL
DAMPING DEVICE FOR WEIGHING APPARATUS
Filed March 30, 1921
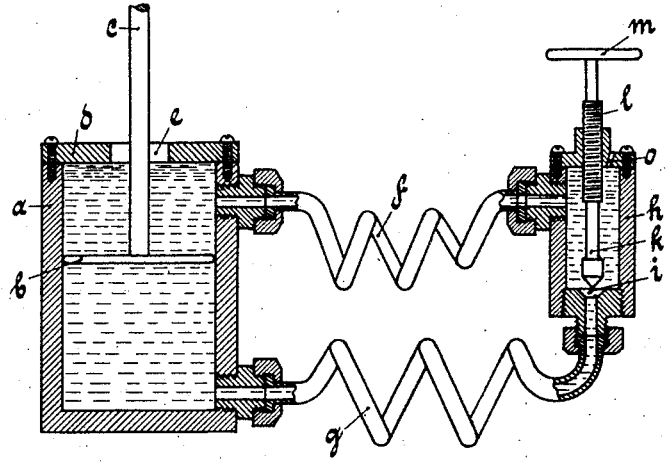
Inventor
Cornelis Franciscus Marie van Berkel
By
Byrnes Townsend & Brickenstein
Attorneys Patented June 5, 1923.

1,457,328

UNITED STATES PATENT OFFICE.

CORNELIS FRANCISCUS MARIE VAN BERKEL, OF ROTTERDAM, NETHERLANDS, ASSIGNOR TO MAATSCHAPPIJ TOT VERVAARDIGING VAN SNIJMACHINES VOLGENS "VAN BERKEL'S PATENT" EN VAN ANDERE WERKTUIGEN, OF ROTTERDAM, SOUTH HOLLAND, NETHERLANDS, A LIMITED LIABILITY COMPANY OF THE NETHERLANDS.

DAMPING DEVICE FOR WEIGHING APPARATUS.

Application filed March 30, 1921. Serial No. 457,135.

*To all whom it may concern:*

Be it known that I, CORNELIS FRANCISCUS MARIE VAN BERKEL, a citizen of the Kingdom of the Netherlands, residing at Rotterdam, in the Province of South Holland and Kingdom of the Netherlands, have invented certain new and useful Improvements in Damping Devices for Weighing Apparatus, of which the following is a specification.

As it is obvious, all known damping devices have to be provided with effective damping means. Usually an arrangement is applied, comprising a cylinder, filled with oil, glycerine or other viscous liquid in which a piston is movable, said piston being secured to the beam of the weighing apparatus by means of a piston rod. Usually such piston consists of two parts, being adjustable with respect to each other. By varying the relative position of said parts, the area of the passage between the spaces above and below the piston may be regulated.

Said parts may, e. g., consist of two plates each having a series of openings, one of said plates being rotatable about the piston rod by means of a sleeve extending beyond the cylinder and having a handle secured thereto.

In the case of these constructions the drawback exists, that such handle or other member serving the same purpose, is arranged within the casing of the weighing apparatus and is therefore difficult to handle. Moreover the casing has to be provided with an opening for said handle, such opening allowing the entrance of dust and dirt into the mechanism.

A mechanical transmission of the regulating device to the outside of the casing would necessarily involve friction, be it rolling friction or sliding friction, which would exert an undue strain upon the weighing mechanism.

The invention has for its object a damping device, which does not show the above mentioned drawback but by which in a simple manner a continuous and exact regulation of the damping is made possible, without it being necessary to reach into the interior of the weighing mechanism.

According to the present invention the said object is obtained by that in the lower portion of the damping cylinder a tube opens leading to the seat of an adjustable throttle valve, whilst the casing of said valve, which is open at the top, is in communication with the upper portion of the cylinder by means of a substantially horizontal pipe.

This construction gives the advantage, that the moving parts need nowhere to be packed since they never stand under an overpressure so that the oil is prevented from leaking.

In order that the invention may be readily understood it is hereinafter more fully explained with reference to the annexed drawing, in which an embodiment of the invention is shown in sectional elevation.

With reference to the drawing $a$ is the damping cylinder or dash pot, $b$ the piston and $c$ the piston rod. The cylinder is provided with a cover $d$ having a central opening $e$ through which the rod $c$ can freely pass. The cylinder $a$ is connected to the casing $h$ of a throttle device by means of two pipes $f$ and $g$. The pipe $g$ terminates in a seat $i$ on which the conical end of the pin $k$ fits. The pin $k$ is provided with a screw thread $l$ and the handwheel $m$. The regulation of the area of the passage $i$ is performed by more or less unscrewing the pin $k$.

The piston rod $c$ is connected to the beam (not shown) of the weighing apparatus so that the oscillations of the said beam will cause the piston $b$ to reciprocate.

The apparatus is totally filled with oil, glycerine or any other viscous liquid. When the rod $c$ is pressed down, the piston $b$ forces the oil through the pipe $g$ and the opening $i$ into the casing $h$ and from that, through the pipe $f$ into the space above the piston. The dimensions of the opening $i$ determine the rate of speed with which the liquid passes and therefore the rate of damping executed upon the downwardly moving rod $c$. When the rod $c$ is lifted, the oil flows in the opposite direction after the rising piston and also in this case the opening $i$ determines the speed of the passage and therefore the damping.

A hole $o$ made in the cover of the throttle device ensures, that no air cushion is formed in the casing $h$ above the oil.

The position of the brake cylinder with respect to the throttle device is fixed. The liquid has always to fill the pipe $f$ entirely.

In the case of this construction the casing $h$ may be arranged in a suitable place outside the weighing apparatus and in this way the damping may be controlled by the handwheel $m$ from without. Another advantage is, that no extra moving parts are connected to the piston and piston rod. Since said parts belong to the moving balanced mass wear of these parts will cause inexactness. Due to the absence of wear this is totally excluded. A third advantage lies in that the passage does not vary of its own accord, which in other apparatus, with a short stroke may readily happen, so that a regulation is often necessary.

What I claim is:

In weighing apparatus, the combination of a damping cylinder open at its top, a communication between the upper portion of the cylinder and the lower portion of the cylinder including a substantially horizontal pipe leading from the upper portion of the cylinder and a pipe leading from the lower portion of the cylinder and a throttle valve between the said pipes, said throttle valve comprising a casing open at its top and connected near its top with the horizontal pipe and connected near its bottom with the other pipe and means in the casing for controlling the flow of liquid therefrom into the said other pipe and vice versa.

In testimony whereof, I affix my signature.

CORNELIS FRANCISCUS MARIE van BERKEL.